Figure 1:
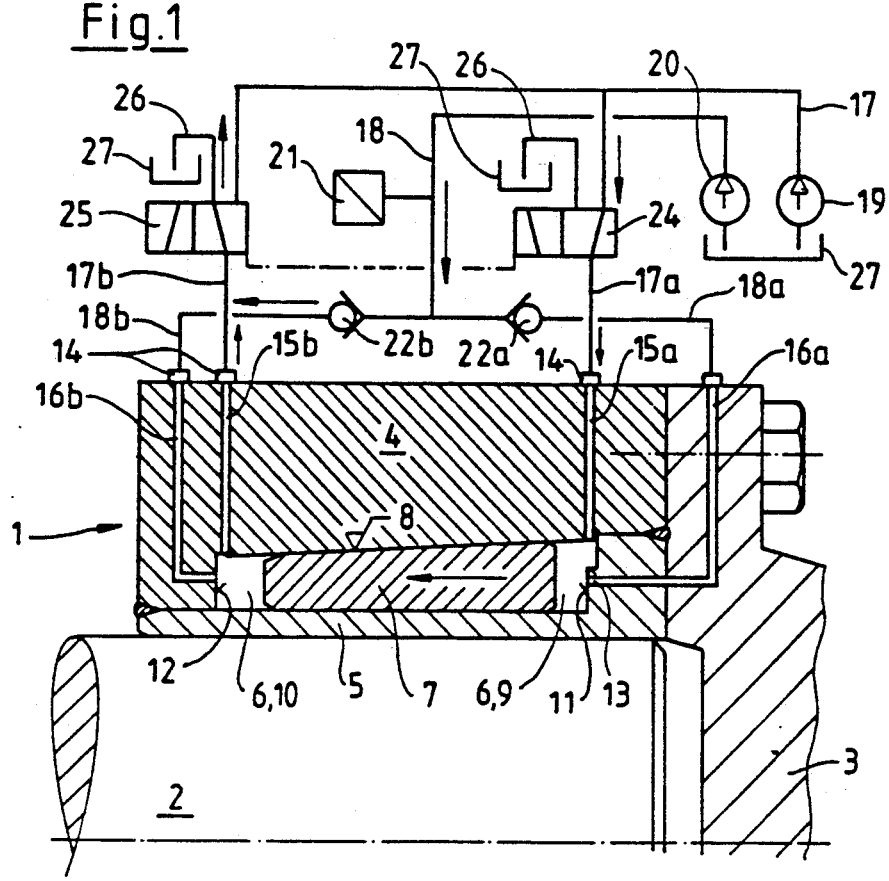

United States Patent [19]

Elsner

[11] Patent Number: 5,156,480
[45] Date of Patent: Oct. 20, 1992

[54] FRICTIONAL RESISTANCE COUPLING

[75] Inventor: Ernst Elsner, Herbrechtingen, Fed. Rep. of Germany

[73] Assignee: J. M. Voith GmbH, Heidenheim, Fed. Rep. of Germany

[21] Appl. No.: 716,569

[22] Filed: Jun. 17, 1991

[51] Int. Cl.$^5$ ............................................. F16B 2/04
[52] U.S. Cl. ......................................... 403/5; 403/15; 403/27
[58] Field of Search ................................ 403/5, 15, 27

[56] References Cited

U.S. PATENT DOCUMENTS

| | | | |
|---|---|---|---|
| 3,216,540 | 11/1965 | Blinn | 403/15 |
| 4,105,343 | 8/1978 | Riegler et al. | 403/15 |
| 4,616,948 | 10/1986 | Jelfs | 403/5 |
| 4,859,106 | 8/1989 | Elsner et al. | 403/5 |

FOREIGN PATENT DOCUMENTS 3833350  4/1990  Fed. Rep. of Germany ........... 403/5

*Primary Examiner*—Andrew V. Kundrat
*Attorney, Agent, or Firm*—Caesar, Rivise, Bernstein, Cohen & Pokotilow

[57] ABSTRACT

The invention relates to a frictional resistance coupling for transmitting torque between two coaxial components, for example a shaft with an articulated shaft, the coupling comprises an outer part and an inner part, which enclose an inner chamber with a conical wall. Inserted to move axially in the inner chamber is an annular piston of the same conicity, so that when the annular piston moves axially by means of a pressure medium, a radial clamping force and thus frictional resistance for transmitting torque is produced. The pressure chambers located on both sides of the annular piston in each case comprise a further connection to a low pressure source. The pressure chamber respectively not supplied with high pressure is supplied with pressure medium from a low pressure source during the displacement process and when the piston reaches the end position within the inner chamber, the opening of the low pressure passage is closed by the end face of the piston. Thereupon a higher pressure builds up in the low pressure supply line and a sensor apparatus emits a signal at the time of a corresponding pressure, which is an indication that the annular piston has definitively reached its end position. The apparatus according to the invention should increase the safety against slipping, which is of great signficance particularly in the construction of heavy machines.

10 Claims, 2 Drawing Sheets

FRICTIONAL RESISTANCE COUPLING

The invention relates to a frictional resistance coupling for the non-rotary and releasable connection of two coaxial components, for example of a hub to a shaft according to the features described in the preamble of claim 1.

A coupling of this type is known from EP-PS 0 178 300 (U.S. Pat. No. 4,616,948). The known coupling comprises an outer part and an inner part, which between them enclose an annular chamber which is conical in the axial direction and is pressure-tight. A symmetrically conical annular piston is arranged to move axially in this annular chamber. The displacement comes about due to the supply of a pressure medium to respectively one of the two end faces of the annular piston, due to which a radial clamping force is exerted for example on the shaft for the transmission of a torque by frictional resistance. The outer part of the known coupling may be constructed either for insertion in the hub of another component or as an independent component attached on its end face for example to an articulated shaft. The fit between the surfaces involved in the frictional resistance must therefore be fixed exactly. In this case, the full torque-transmission capacity between the surfaces involved in the frictional resistance, in particular on the shaft surface, is only guaranteed if the internal annular piston completes an adequate stroke. The stroke movement itself cannot be ascertained from outside and the action of different pressures on the annular piston for achieving a certain frictional resistance involves great tolerances. The dimensioning of the frictional resistance coupling for a shaft/hub connection is therefore generally such that the full torque can be transmitted even if the annular piston has completed its maximum stroke in the internal chamber.

In this case, it would even be conceivable to monitor the position of the internal annular piston for example by means of a mechanical probe. However, this process generally fails owing to the lack of available axial space beside the frictional resistance coupling. Furthermore the latter involves the risk of dirt entering the inner chamber and giving rise to later disturbances.

The object of the invention consists of developing the known coupling so that it is possible in a simple and reliable manner to ascertain the final position of the annular piston reached in the inner chamber.

This object is achieved by the characterising features of claim 1. According to the invention, leading into each of the pressure chambers formed on the end face between the annular piston and the inner chamber is a further pressure medium line, which is connected to a low pressure source. The opening of this pressure medium line serving as a measuring line, in the end region of the two pressure chambers, can be closed by the annular piston on reaching the end position. Located in the supply line from the low pressure source to the pressure chambers on the frictional resistance coupling is a sensor apparatus, which monitors the pressure rise in this line and on reaching a certain value emits a corresponding signal. With this arrangement the following is achieved: The frictional resistance coupling now has a high pressure connection and a low pressure connection. By means of the pressure medium which is under high pressure, the annular piston should be brought into the other end position due to the supply of pressure medium to one pressure chamber. On the other hand, the other pressure chamber is connected to the low pressure source so that a permanent circulation of pressure medium comes about. If the piston moves under the effect of the high pressure, then on the one hand the pressure medium located in the other pressure chamber is displaced, on the other hand, also the pressure medium supplied by the low pressure source, which is supplied through a separate passage. The displaced and newly supplied pressure medium may escape into a collecting container through the passage provided for the supply of high pressure medium. If, under the pressure in the one pressure chamber, the annular piston reaches its end position in the other pressure chamber, then the annular piston itself closes off the opening for pressure medium flowing from the low pressure source. The result of this is a rise in the pressure in the supply line, which has the function of a measuring line, between the pressure source and the frictional resistance coupling. The sensor apparatus located in this measuring line reacts to the rising pressure and on reaching a certain pressure value emits a signal, which indicates that the annular piston has reached its end position. This is actually also solely the case when the annular piston has closed the opening for the measuring line within the pressure chamber, so that a pressure increase can be measured at the sensor apparatus. This method of operation is provided in the same way in both displacement directions for the annular piston within the inner chamber. The same medium can be used in each case as the pressure medium, it being supplied solely at different pressures to different connection points on the frictional resistance coupling. On reaching the end position of the annular piston, the signal emitted by the sensor apparatus may also be used for example for switching-off the pump unit for the high pressure and the low pressure. Anyhow, as known, on reaching the end position of the annular piston, the pressure in the pressure chambers is reduced.

Advantageous developments of the invention are described in the sub-claims. According to claims 2 to 4, a valve arrangement is provided in the pressure medium supply line between the sensor apparatus and the frictional resistance coupling, by which valve arrangement respectively one of the two pressure chambers is closed, whereas the other pressure chamber is supplied with pressure medium from the low pressure source. This valve arrangement may consist of two non-return valves, which allows the pressure medium to flow solely in the direction towards the pressure chambers, or it may be a valve design with two end positions, for example a slide valve, which in each end position opens the path to one of the two pressure chambers. According to claims 5 and 6, the valve arrangement for the low pressure measuring line to the pressure chambers may be connected to a valve combination for the supply of high pressure to the pressure chambers, the arrangement being such that in each case one of the two pressure chambers is connected to the high pressure source and the other pressure chamber is connected to the low pressure source. According to claims 7 and 8, the connections for the high pressure and low pressure lines may be located on the outer surface of the frictional resistance coupling, the passages for the high pressure supply into the pressure chambers also being able to open radially into the inner chamber. According to claim 9 it is provided that the low pressure measuring lines open out on the end faces of the pressure chambers constructed as axis-normal surfaces, the annular piston also being constructed with axis-normal plane end faces. Consequently the end faces of the annular piston form plane sealing surfaces on the end faces of the pressure chambers or the openings of the low pressure measuring lines, so that in the case of a minimal stroke of the annular piston within the inner chamber, it is already possible to recognise by way of the sensor apparatus, whether the annular piston has or has not definitively reached the end position within the inner chamber. According to claim 10 it is provided that a pressure should prevail in the low pressure system, which amounts approximately to between 5 and 10% of the high pressure. Consequently it should be prevented that an excessively high pressure on the low pressure side impedes the axial displacement of the annular piston under the effect of the high pressure, so that under certain circumstances the annular piston does not even reach its end position. Due to this the complete build-up of the frictional resistance would be jeopardised.

Figure 2:
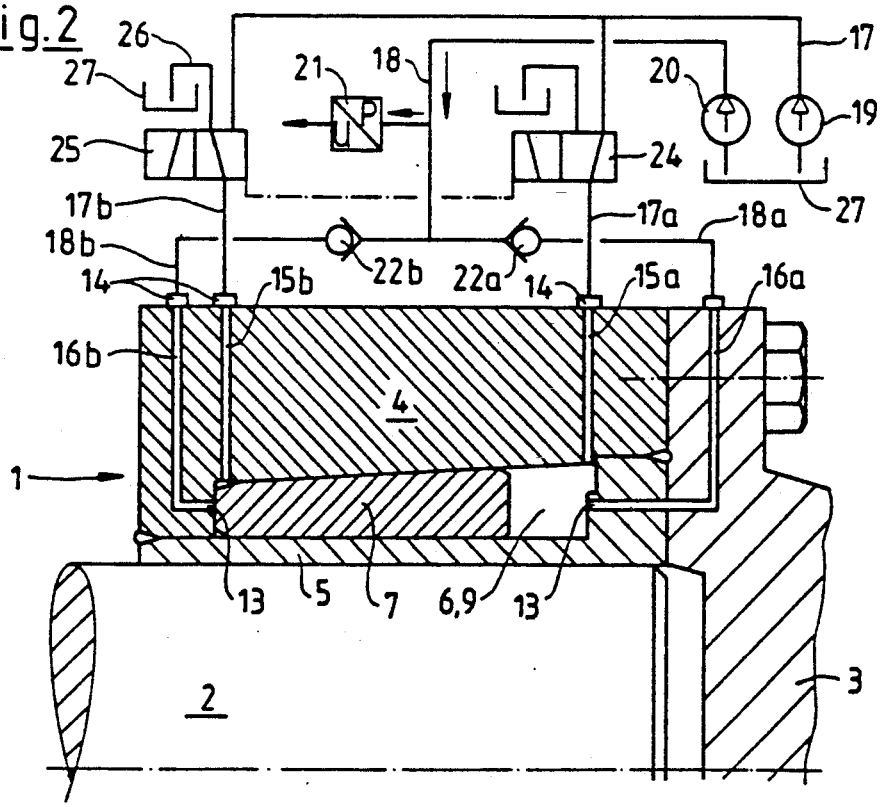
Figure 3:
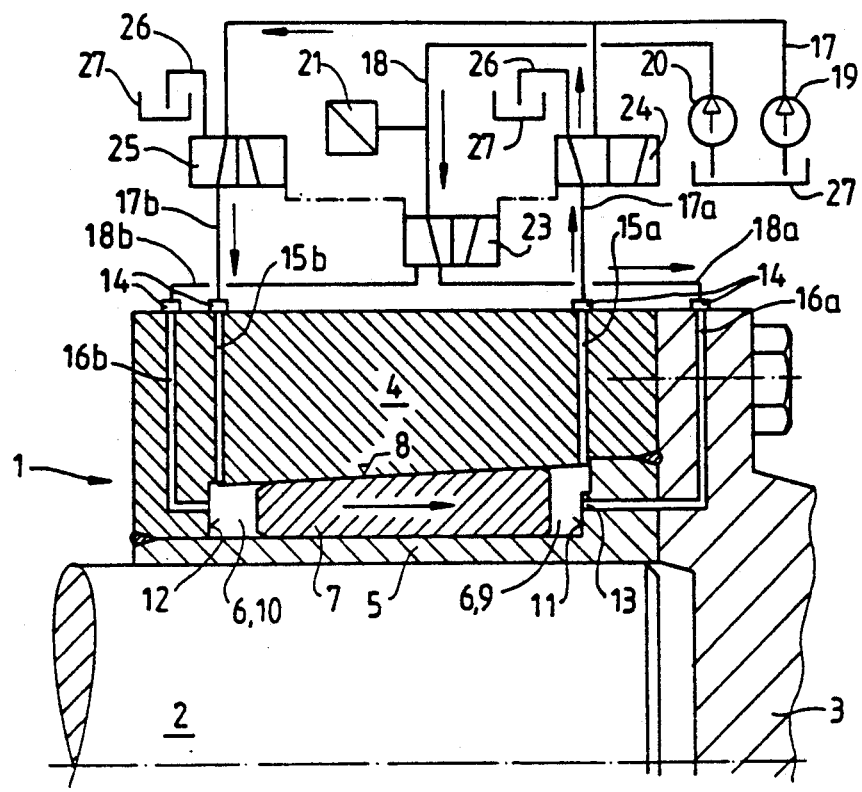
Figure 4:
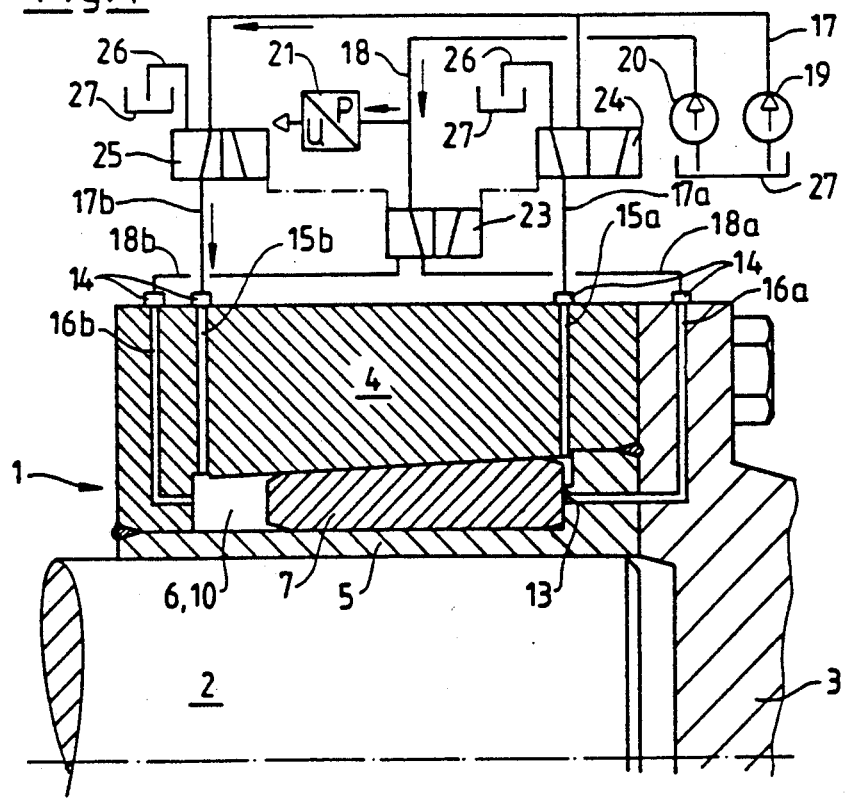

The invention is described in detail hereafter with reference to the drawings, which illustrate one embodiment. In the drawings:

FIGS. 1 and 2 are diagrammatic illustrations of a coupling in the half-engaged and fully engaged position with a non-return valve combination in the low pressure measuring line, FIGS. 3 and 4 are corresponding illustrations in the half disengaged and fully disengaged position with a slide valve combination in the low pressure measuring line.

In FIG. 1, a frictional resistance coupling 1 is illustrated as an independent component, which is installed for the transmission of torque between a shaft 2 and a flange 3, for example an articulated shaft flange. It comprises an outer part 4 and an inner part 5, which are connected to each other in a pressure-tight manner and between them enclose an inner chamber 6. In the region of the outer part 4, this inner chamber 6 has a conical wall 8 and an annular piston 7 with the same conicity is inserted to move longitudinally in the inner chamber 6. The annular piston 7 divides the inner chamber 6 so that two pressure chambers 9, 10 are formed at the end faces. By supplying pressure medium into respectively one of the pressure chambers 9 or 10, the annular piston can be displaced axially, so that by way of the conical wall 8, a radial clamping force occurs between the outer part 4 and the inner part 5, due to which frictional contact between the inner part 5 and the shaft 2 comes about.

Serving for the supply of pressure medium to the pressure chambers 9, 10 is a high pressure source 19, from which pressure medium can be supplied at high pressure by way of a high pressure line 17, screw couplings 14 and passages 15a, 15b in the outer part 4. Disposed in the high pressure line 17 are valves 24, 25, which allow the inflow of pressure medium by way of lines 17a, 17b respectively solely to one of the two pressure chambers 9, 10. The position is illustrated in which the pressure chamber 9 is under high pressure. The pressure chamber 10 not connected to the high pressure source 19 is connected by way of the passage 15b to the outer region at zero pressure, i.e. by way of a discharge line 26, displaced pressure medium may flow into a container 27.

Opening into the pressure chambers 9, 10 are in each case further passages 16a and 16b, which are connected by means of screwed couplings 14 by way of low pressure lines 18, 18a, 18b to a low pressure source 20. Inserted in the low pressure line 18, before the opening into the passages 16a, 16b are non-return valves 22a, 22b, which allow the pressure medium to flow from the low pressure source 20 solely in the direction of the pressure chamber 9 or 10. Also connected to the low pressure line 18 is a sensor apparatus 21, which emits a signal in the case of a corresponding increase in pressure.

If, as shown in FIG. 1, the annular piston 7 is located in a central position between the two end positions and the valve combination 24, 25 is adjusted so that the valve 24 clears the path for the pressure medium to the pressure chamber 9, then the valve 25 is located in the position such that the inside of the pressure chamber 10 is connected to the container 27. Under the effect of the high pressure, the annular piston 7 is now moved towards the left in the direction of the arrow. This high pressure simultaneously has an effect in the passage 16a and the line 18a, due to which the non-return valve 22a is closed. The pressure medium conveyed from the low pressure source 20 accordingly flows from the line 18 through the non-return valve 22b, the line 18b and the passage 16b into the pressure chamber 10. From there it is once more displaced through the passage 15b, the valve 25 and the discharge line 26 into the container 27.

FIG. 2 shows the situation in which the annular piston 7 has reached its outermost end position completely on the left-hand side. The end face of the annular piston 7 is now in contact with the end face 12 of the pressure chamber 10 and in this case closes the opening 13 of the passage 16b. This causes a pressure rise in the line 18 in front of the sensor apparatus 21. The latter now converts a pressure signal p into a mechanical or electrical signal u, due to which it is indicated that the annular piston 7 has reached its end position and the full frictional resistance between the frictional resistance coupling 1 and the shaft 2 is built-up. The signal u indicating the end position of the annular piston 7 may also be used for once more switching-off the drive for the pressure sources 19, 20 constructed as pumps.

FIGS. 3 and 4 show the frictional resistance coupling 1 with basically the same construction as in FIGS. 1 and 2, but in place of the non-return valves 22a, 22b, a directional control valve 23 is provided in the low pressure line 18 between the low pressure source 20 and the passages 16a, 16b. This directional control valve 23 for the low pressure may advantageously be connected to the valves 24, 25 for the high pressure, so that it is actuated or reversed simultaneously therewith. FIG. 3 again shows the annular piston in a central position in the inner chamber 6 of the frictional resistance coupling. The valves 24 and 25 are in a position in which the pressure medium under high pressure is supplied through the line 17, the valve 25 and the passage 15b into the pressure chamber 10. The pressure chamber 9 is relieved of pressure by way of the passage 15a, the valve 24 and the discharge line 26 into the container 27. Due to the permanent connection of the valve 23 to the valves 24, 25, the former is in the position in which the pressure medium at low pressure is necessarily supplied to that pressure chamber which is not under high pressure. In the present case, this is the pressure chamber 9. The high pressure, which continues through the passage 16b to the valve 23, brings about the axial displacement of the annular piston 7 towards the right in the direction of the arrow, thus towards the released position of the coupling.

If the annular piston 7 has reached its end position, then similar to the function according to FIGS. 1 and 2, the opening 13 of the passage 16a is closed by the end face of the annular piston. A pressure thus once more builds up in the line 18, due to which the sensor apparatus 21 converts the pressure p into a signal u.

As mentioned at the beginning, the radial clamping force of the coupling is highly dependent on the effectively adopted position of the annular piston with the conical wall. It is thus a question of indicating reaching of the end position actually for the first time when the piston has also reached it, thus with only small stroke tolerances. The end faces 11, 12 of the pressure chambers are therefore preferably constructed as annular surfaces with an axis-normal plane, into which the passages 16a, 16b open in the axial direction. The end faces of the annular piston 7 are likewise constructed as axis-normal end faces, so that these are capable of acting as sealing surfaces in front of the openings 13 of the passages 16a, 16b. It is thus ensured that an end position control with the smallest piston stroke takes place, the force acting by means of high pressure on the rear side of the piston appearing as a sealing force at the openings 13.

Whereas the pressure from the high pressure source 19 may amount to up to several hundred bars according to the application and design of the frictional resistance coupling, the pressure from the low pressure source 20 should amount to a maximum of 10% of the high pressure. In this case it is namely solely a measuring function from the low pressure source 20, in which case the pressure in the respectively reducing pressure chamber should not impair the stroke movement of the annular piston. Generally a pressure in the range of 10 bars will suffice in the low pressure part. Varying from the embodiment illustrated, it is also possible to provide solely a single pressure source, the low pressure in the line 18 being taken from the high pressure line 17 by means of a pressure-reduction apparatus.

I claim:

1. Frictional resistance coupling for the non-rotary and releasable connection of two coaxial components, for example a hub and a shaft, with the following features:
   a. an outer part facing the hub and an inner part facing the shaft said outer and inner parts defining an annular chamber, the walls of which are inclined to each other, said chamber extending axially and being pressure-tight towards the outside;
   b. located in the annular chamber is a conical, annular piston, whereof the surfaces bear in a sealing manner against the surfaces of the annular chamber, which annular piston is able to slide axially in the annular chamber and at its end faces forms pressure chambers with the annular chamber;
   c. leading to each pressure chamber is a passage for the supply of pressure medium which can be supplied from a high pressure source into respectively on of the two pressure chambers;
   characterized by the combination of the following further features:
   d. leading to each pressure chamber (9, 10) is a further measuring line (18, 18a, 18b) able to be connected to a low pressure source (20), which measuring line opens out at the axial end face (12, 13) of each pressure chamber (9, 10);
   e. the opening (13) of the measuring line (18, 18a, 18b, 16a, 16b) can be closed by the annular piston (7);
   f. a sensor apparatus (21) for the pressure rise in the measuring line (18, 18a, 18b) is disposed in the supply line (18) from the low pressure source (20) to the frictional resistance coupling (1).

2. Coupling according to claim 1, characterized by a valve arrangement (22a, 22b, 23) in the measuring line (18a, 18b) between the sensor apparatus (21) and the frictional resistance coupling (1), so that respectively the inflow of pressure medium to one of the two pressure chambers (9, 10) is closed.

3. Coupling according to claim 2, characterised in that installed in each measuring line (18a, 18b) to the pressure chambers (9, 10) is a non-return valve (22a, 22b), which allows the flow of the pressure medium solely in the direction of the respective pressure chamber (9, 10).

4. Coupling according to claim 2, characterised in that the valve arrangement consists of a valve (23) with two end positions, the passage of pressure medium to one of the two pressure chambers (9, 10) being allowed in each end position.

5. Coupling according to claim 4, characterised in that the valve (23) for the measuring line (18a, 18b) is connected to a valve combination (24, 25) for the high pressure supply line (17, 17a, 17b) to the pressure chambers (9, 10).

6. Coupling according to claim 5, characterised in that the valve combination (23, 24, 25) is constructed so that in each case one of the pressure chambers (9, 10) is connected to the high pressure source (19) and the other of the pressure chambers is connected to the lower pressure source (20), the passage (15a, 15b) which is not under high pressure at the pressure chamber supplied with low pressure, being connected to a collecting container (27).

7. Coupling according to claim 1, characterised in that connections (14) for the supply of high pressure or low pressure medium are disposed on the outer surface.

8. Coupling according to claim 1, characterised in that the passages (15a, 15b) for the supply of pressure medium at high pressure open radially into the pressure chambers (9, 10).

9. Coupling according to claim 1, characterised in that the measuring lines (18a, 18b) open out on the end faces (11, 12) of the pressure chambers (9, 10) with an axis-normal plane and that the annular piston comprises end faces constructed in an axis-normal manner, for sealing the openings (13).

10. Coupling according to claims 1, characterised in that the pressure in the low pressure line (18) amounts to between 5 and 10% of the pressure in the high pressure line (17).

* * * * *